United States Patent
Chen

(10) Patent No.: US 8,246,336 B2
(45) Date of Patent: Aug. 21, 2012

(54) INJECTION MOLDING MACHINE

(75) Inventor: Hsiang-Hung Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 168 days.

(21) Appl. No.: 12/791,887

(22) Filed: Jun. 2, 2010

(65) Prior Publication Data

US 2011/0244065 A1 Oct. 6, 2011

(30) Foreign Application Priority Data

Apr. 6, 2010 (TW) .............................. 99110654 A

(51) Int. Cl.
*B29C 45/53* (2006.01)
*B29C 45/66* (2006.01)

(52) U.S. Cl. ...................... 425/174.6; 425/557; 425/559; 425/565; 425/589; 425/593

(58) Field of Classification Search ........... 425/3, 174.6, 425/557, 547, 559, 565, 589, 593
See application file for complete search history.

(56) References Cited

U.S. PATENT DOCUMENTS

| 3,005,421 | A | * | 10/1961 | Lea | ................................ 425/165 |
| 5,821,841 | A | * | 10/1998 | Furlani et al. | ............. 264/272.19 |
| 6,267,580 | B1 | * | 7/2001 | Leopold et al. | ................ 425/557 |

* cited by examiner

*Primary Examiner* — Richard Crispino
*Assistant Examiner* — Thukhanh Nguyen
(74) *Attorney, Agent, or Firm* — Altis Law Group, Inc.

(57) ABSTRACT

An injection molding machine includes a hydraulic driving system providing hydraulic power; a molding system configured for molding a workpiece; and an injection system configured for injecting a molten material to the molding system with the hydraulic power. The injection system includes a cylinder and a piston movably received in the cylinder. The cylinder is surrounded by one of an alternating current-charged coil of wire and a closed-loop coil of wire, and the piston is surrounded by the other, whereby the piston receives acceleration for movement in the cylinder.

8 Claims, 3 Drawing Sheets

INJECTION MOLDING MACHINE

BACKGROUND

1. Technical Field

The present disclosure relates to injection molding, and particularly to an injection molding machine.

2. Description of Related Art

Injection molding is widely used for fabricating plastic and metallic workpieces. A typical injection molding machine includes a hydraulic driving system, an injection system and a molding system. The injection system powered by the hydraulic driving system, injects molten material into the molding system.

Injection power represents ability of the injection system, and is determined by injection pressure and injection speed. The injection pressure is the pressure of the injection system applied on the molten material, and the injection speed is determined by a movement speed of a piston of the injection system. Production time is shortened if the injection speed improves, especially for small and thin workpieces.

What is needed, therefore, is an injection molding machine with high injection speed.

BRIEF DESCRIPTION OF THE DRAWINGS

Many aspects of the present injection molding machine can be better understood with reference to the following drawings. The components in the drawings are not necessarily drawn to scale, the emphasis instead being placed upon clearly illustrating the principles of the present injection molding machine. Moreover, in the drawings, like reference numerals designate corresponding parts throughout the several views.

DETAILED DESCRIPTION

Embodiments of the present injection molding machine will now be described in detail and with reference to the drawings.

Figure 1:
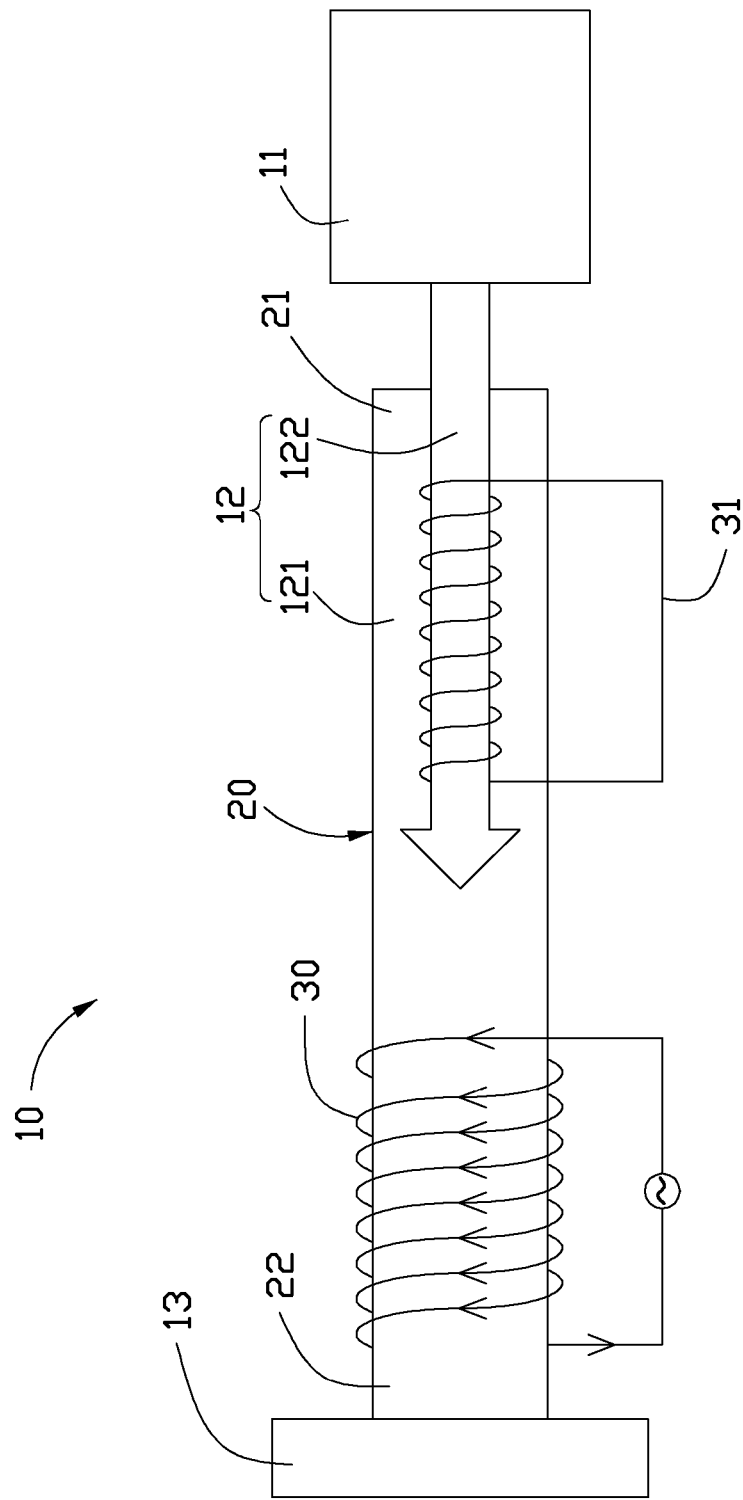
FIG. 1 shows an injection molding machine in accordance with a first embodiment.

Referring to FIG. 1, an injection molding machine 10 in accordance with a first embodiment, is shown. The injection molding machine 10 includes a hydraulic driving system 11, an injection system 12 and a molding system 13. The hydraulic driving system 11 is configured for providing hydraulic power to the injection system 12, by which the molten material is injected into the molding system 13.

The injection system 12 includes a cylinder 121 and a piston 122 movably received in the cylinder 12. The cylinder 121 includes an outer surface 20 surrounding the entire cylinder 121, a first end 21, and an opposite second end 22. The first end 21 is adjacent to the hydraulic driving system 11, and the second end 22 is adjacent to the molding system 13. The first end 21 may be in communication with a hopper (not shown) whereby the molten material is introduced. The piston 122 moves toward the second end 22 to impel the molten material to the molding system 13, and retracts to the first end 21 to prepare for the next injection. The hydraulic power provided by the hydraulic driving system 11 provides impetus for the piston 122 to move in the cylinder 121 towards the first end 21 and second end 22.

An alternating current-charged coil 30 surrounds the outer surface 20, mainly near the second end 22. A closed-loop coil of wire 31 similarly surrounds the piston 122. Intensity and direction of the supplied alternating current are periodically changed, such that the coil 30 generates alternating electromagnetic fields. With the alternating electromagnetic field generating alternating magnetic flux through the coil of wire 31, according to Faraday's law of induction, an induced current results. When the piston 122 is at the first end 21 and is impelled towards the second end 22, if alternating current drops and magnetic flux decreases, the coil of wire 31 is attracted to coil 30 according to Lenz's law, further accelerating the piston 122 towards the second end 22.

Approaching the second end 22, the piston 122 impels the molten material into the molding system 13. When the piston 122 begins to return, if at the same time the alternating current is increased and the magnetic flux with it, the coil of wire 31 is repelled from the coil 30 according to Lenz's law, accelerating the piston 122 back towards the first end 21.

The coil 30 can also be arranged on the inner surface of the cylinder 121.

It is understood that the coil 30 can surround the piston 122, and the coil of wire 31 surrounds the cylinder 12. In addition, the coil 30 can be replaced by an electromagnet which may further include an iron core inside the charged coil.

Figure 2:
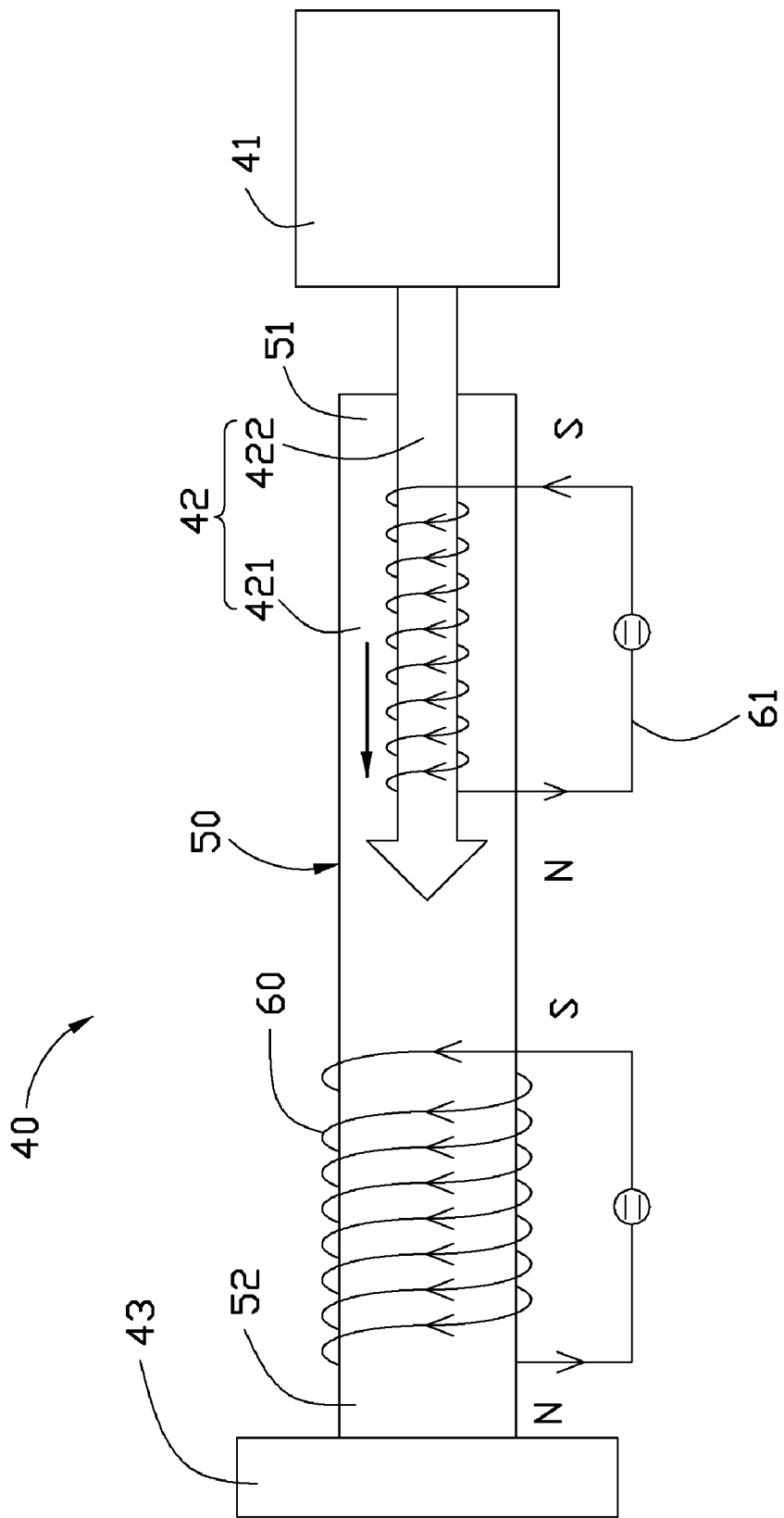
FIG. 2 shows an injection molding machine in accordance with a second embodiment, wherein a piston thereof at a first end of a cylinder moves towards a second end of the cylinder.

Referring to FIG. 2, an injection molding machine 20 in accordance with a second embodiment is shown, differing from injection molding machine 10 only in that outer surface 50 of cylinder 421 is surrounded by a direct current-charged first coil 60, and piston 422 is surrounded by a direct current-charged second coil 61.

When the piston 422 at the first end 51 is impelled to move towards the second end 52 in a direction as indicated by the arrow in FIG. 2, the first coil 60 and the second coil 61 receive direct current, such that a magnetic field direction of the first coil 60 is the same as that of the second coil 61. In the illustrated embodiment of FIG. 2, an N polarity of the magnetic field of the first coil 60 corresponds to the second end 52, an S polarity of the magnetic field of the first coil 60 corresponds to the first end 51, and the magnetic field direction inside the first coil 60 is toward the N polarity (i.e., toward the second end 52). The magnetic field direction of the second coil 61 is the same as the magnetic field direction of the first coil 60. In an alternative embodiment (not shown), the first and second coils 60 and 61 also have the same magnetic field directions, but the magnetic field directions are both toward the first end 51. In either state, the second coil 61 is attracted by the first coil 60, accelerating the piston 422 towards the second end 52.

When the second coil 61 nears the second end 52, close to the first coil 60, the first coil 60 is powered off, terminating magnetic repelling force. At this time, the piston 422 is driven only by the hydraulic driving system 41.

Figure 3:
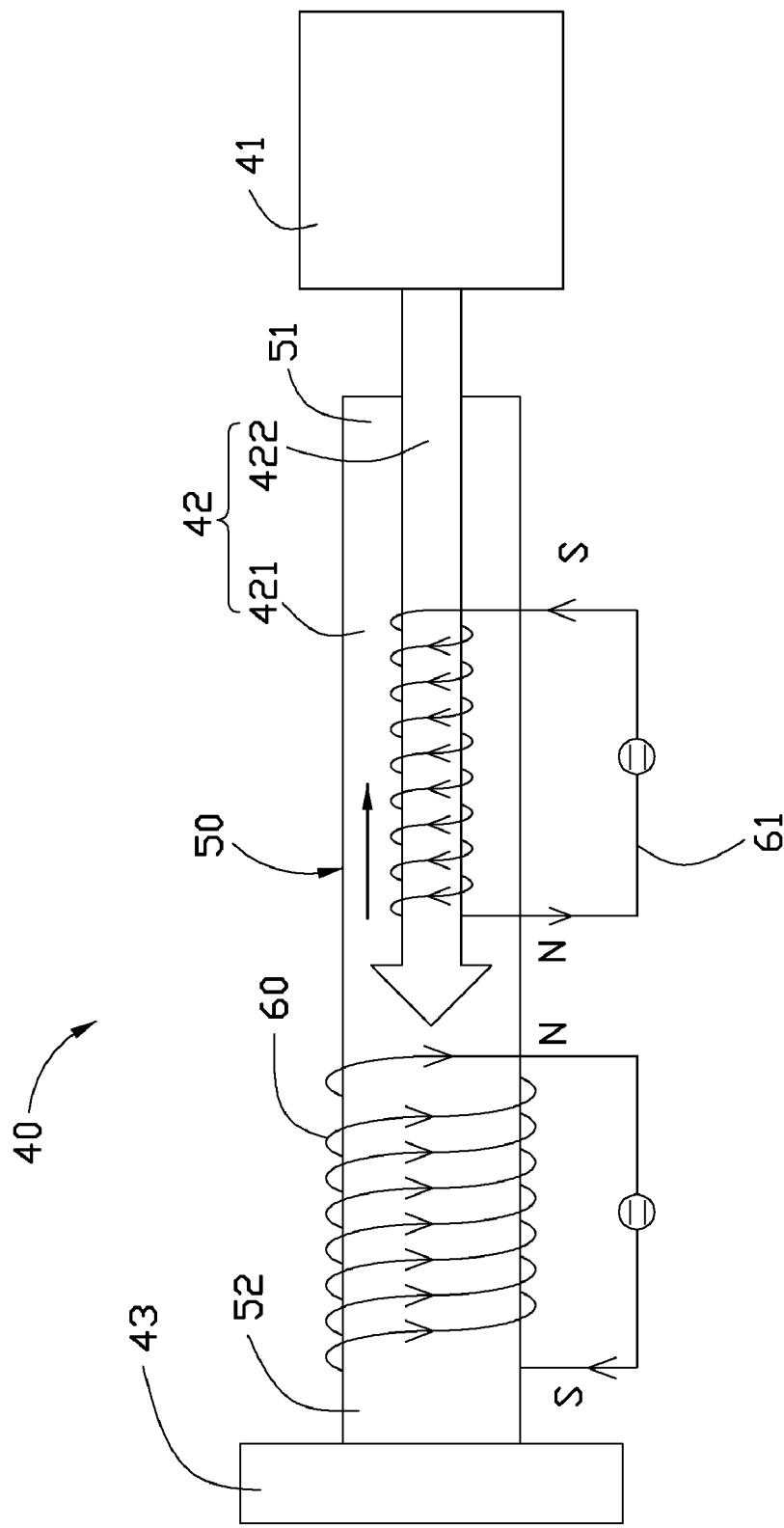
FIG. 3 is similar to FIG. 2, but shows the piston moving back towards the first end of the cylinder.

Approaching the second end 52, the piston 422 impels the molten material into the molding system 43. Referring to FIG. 3, when the piston 422 moves back along a direction as indicated by the arrow and the second coil 61 begins to depart from the first coil 60, the direction of direct current applied on the first coil 60 is changed, whereby a magnetic field direction of the first coil 60 is opposite to the magnetic field direction of the second coil 61. In this state, the second coil 61 is repelled by the first coil 60. In this way, the first and second coils 60 and 61 cooperatively accelerate the piston 422 backwards towards the first end 51.

The acceleration improves the injection speed of the injection system, which shortens a production time of the injection molding machine.

It is understood that the described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An injection molding machine, comprising:
a hydraulic driving system for providing hydraulic power;
a molding system configured for molding a workpiece;
an injection system configured for injecting molten material into the molding system with the hydraulic power, the injection system comprising a cylinder and a piston movably received in the cylinder;
an alternating current-charged coil configured to allow flow of an alternating current therethrough; and
a closed-loop coil of wire;
wherein one of the alternating current-charged coil and the closed-loop coil of wire surrounds the cylinder, and the other one of the alternating current-charged coil and the closed-loop coil of wire surrounds the piston and moves in unison with the piston; and
the alternating current-charged coil imparts a force to the closed-loop coil of wire and makes the other one of the alternating current-charged coil and the closed-loop coil of wire surrounding the piston move acceleratingly, and the piston moves acceleratingly in unison with the other one of the alternating current-charged coil and the closed-loop coil of wire.

2. The injection molding machine of claim 1, wherein the cylinder comprises a first end adjacent to the hydraulic driving system, and an opposite second end adjacent to the molding system, and the alternating current-charged coil is attached on the second end.

3. The injection molding machine of claim 2, wherein the cylinder has an outer surface, surrounded by the alternating current-charged coil.

4. An injection molding machine, comprising:
a hydraulic driving system;
a molding system configured for molding a workpiece; and
an injection system powered by the hydraulic driving system and configured for injecting molten material to the molding system, wherein the injection system comprises a cylinder and a piston movably received in the cylinder;
a direct current-charged first coil of wire; and
a direct current-charged second coil of wire;
wherein the direct current-charged first coil of wire surrounds the cylinder, and the direct current-charged second coil of wire surrounds the piston and moves in unison with the piston; and
the direct current-charged first coil of wire imparts a force to the direct current-charged second coil of wire and makes the direct current-charged second coil of wire surrounding the piston move acceleratingly, and the piston moves acceleratingly in unison with the direct current-charged second coil of wire.

5. The injection molding machine of claim 4, wherein each of the first and second coils of wire is configured to allow flow of a direct current therethrough.

6. The injection molding machine of claim 4, wherein the cylinder includes a first end adjacent to the hydraulic driving system, and an opposite second end adjacent to the molding system, and the charged first coil of wire is attached on the second end.

7. The injection molding machine of claim 4, wherein a magnetic field direction of the first coil of wire is adjustable to be the same as a magnetic field direction of the second coil of wire to move the piston towards the molding system.

8. The injection molding machine of claim 4, wherein a magnetic field direction of the first coil of wire is adjustable to be opposite to a magnetic field direction of the second coil of wire to move the piston away from the molding system towards the first end.

* * * * *